United States Patent
Onishi et al.

(10) Patent No.: US 11,356,239 B2
(45) Date of Patent: Jun. 7, 2022

(54) INFORMATION PROCESSING APPARATUS, NETWORK SYSTEM, AND MEDIUM

(71) Applicant: BUFFALO INC., Nagoya (JP)

(72) Inventors: Tatsuya Onishi, Nagoya (JP); Atsuo Nakahata, Nagoya (JP)

(73) Assignee: BUFFALO INC., Nagoya (JP)

( * ) Notice: Subject to any disclaimer, the term of this patent is extended or adjusted under 35 U.S.C. 154(b) by 0 days.

(21) Appl. No.: 17/097,013

(22) Filed: Nov. 13, 2020

(65) Prior Publication Data

US 2021/0184828 A1 Jun. 17, 2021

(30) Foreign Application Priority Data

Dec. 17, 2019 (JP) .............................. JP2019-227035

(51) Int. Cl.
*H04L 7/00* (2006.01)
*G06F 9/52* (2006.01)
*G06F 1/14* (2006.01)

(52) U.S. Cl.
CPC .............. *H04L 7/0037* (2013.01); *G06F 1/14* (2013.01); *G06F 9/52* (2013.01); *H04L 7/0008* (2013.01)

(58) Field of Classification Search
CPC ....... H04L 7/0037; H04L 7/0008; G06F 1/14; G06F 9/52
See application file for complete search history.

(56) References Cited

U.S. PATENT DOCUMENTS

| 10,484,443 | B2* | 11/2019 | Kumetani | ............... G06F 16/00 |
| 2005/0222969 | A1* | 10/2005 | Yip | ...................... H04L 41/0863 |
| 2014/0153047 | A1* | 6/2014 | Tsushima | ............... G06Q 10/06 358/1.15 |
| 2018/0349855 | A1* | 12/2018 | Walker | ............... G06Q 10/1095 |
| 2020/0244538 | A1* | 7/2020 | Nakahata | ................ H04L 41/12 |

FOREIGN PATENT DOCUMENTS

| JP | 2004-266411 A | 9/2004 |
| JP | 2005-71082 A | 3/2005 |
| JP | 2007-36394 A | 2/2007 |
| JP | 2011-223060 A | 11/2011 |
| JP | 2014-112060 A | 6/2014 |
| JP | 2015-179937 A | 10/2015 |

* cited by examiner

*Primary Examiner* — Jaison Joseph
(74) *Attorney, Agent, or Firm* — Xsensus LLP

(57) ABSTRACT

An information processing apparatus that includes processing circuitry that: acquires information regarding a processing content to be performed by a terminal; acquires information regarding a designated time at which the terminal is designated to perform the processing content; acquires a selection of a base time zone from a plurality of time zones including at least a first time zone to which the information processing apparatus belongs and a second time zone to which the terminal belongs, the designated time being corrected according to the selected base time zone to set an execution time at which the terminal performs the processing content; and transmits an instruction to the terminal to perform the processing content at the execution time.

16 Claims, 12 Drawing Sheets

*FIG. 5*

PROCESSING CONTENT

| RESTART ▼ | ~b1

BASE TIME ZONE

● FIRST TIME ZONE  ○ SECOND TIME ZONE  ~b2

DESIGNATED TIME yyyy/mm/dd  📅  HH:MM  ~b3

FIRST TIME ZONE   yyyy/mm/dd  HH:MM  (UTC+9:00)
SECOND TIME ZONE  yyyy/mm/dd  HH:MM  (UTC−5:00)   ~a1

CANCEL   OK

| NAME | RESERVATION SUCCESS OR FAILURE | CONNECTION STATUS | INSTALLATION LOCATION | MODEL NUMBER | LAST UPDATED DATE AND TIME |
|---|---|---|---|---|---|
| AAA | SETTING COMPLETED | CONNECTED | AMERICA xx | 12345 | 2019/11/21 15:00 |
| BBB | SETTING FAILED | DISCONNECTED | AMERICA yy | 67890 | 2019/11/21 15:00 |
| CCC | NO INSTRUCTION | CONNECTED | RUSSIA zz | 12345 | 2019/11/21 15:00 |
| ... | ... | ... | ... | ... | ... |

| NAME | EXECUTION SUCCESS OR FAILURE | CONNECTION STATUS | INSTALLATION LOCATION | MODEL NUMBER | LAST UPDATED DATE AND TIME |
|---|---|---|---|---|---|
| AAA | EXECUTION COMPLETED | CONNECTED | AMERICA xx | 12345 | 2019/11/21 15:00 |
| BBB | EXECUTION FAILED | DISCONNECTED | AMERICA yy | 67890 | 2019/11/21 15:00 |
| CCC | UNEXECUTED | CONNECTED | RUSSIA zz | 12345 | 2019/11/21 15:00 |
| ... | ... | ... | ... | ... | ... |

```
                                                            ─S4
  NAME : AAA

CONNECTION STATUS :            CONNECTED
  INSTALLATION LOCATION :        AMERICA xx
  MODEL NUMBER :                 12345
  LAST UPDATED DATE AND TIME : 2019/11/21 15:00

REMOTE OPERATION PROCESSING CONTENT   RESTART
  EXECUTION SUCCESS OR FAILURE          EXECUTION COMPLETED
  EXECUTION TIME                        yyyy/mm/dd  HH:MM

[UPDATE        [STOP REMOTE
                                     INFORMATION]   OPERATION]
```

FIG. 12

```
                                                                    ┌─S1a
┌─────────────────────────────────────────────────────────────────────┐
│  ┌─────────────────────────────────────────────────┐                │
│  │ NUMBER OF SELECTED TERMINALS TO BE OPERATED │~a2             │
│  └─────────────────────────────────────────────────┘                │
│                                                                     │
│    PROCESSING CONTENT                                               │
│  ┌─────────────────┐                                                │
│  │ RESTART ▼       │~b1                                            │
│  └─────────────────┘                                                │
│                                                                     │
│    BASE TIME ZONE                                                   │
│  ┌─────────────────────────────────────────────┐                    │
│  │ ● FIRST TIME ZONE   ○ SECOND TIME ZONE │~b2                    │
│  └─────────────────────────────────────────────┘                    │
│                                                                     │
│    DESIGNATED TIME                                                  │
│  ┌──────────────────────────────────┐                               │
│  │ yyyy/mm/dd  📅   HH:MM           │~b3                           │
│  └──────────────────────────────────┘                               │
│    ┌────────────────────────────────────────────────────┐           │
│    │ FIRST TIME ZONE      yyyy/mm/dd  HH:MM  (UTC+9:00) │           │
│    │ SECOND TIME ZONE a   yyyy/mm/dd  HH:MM  (UTC-5:00) │~a1        │
│    │ SECOND TIME ZONE b   yyyy/mm/dd  HH:MM  (UTC+8:00) │           │
│    └────────────────────────────────────────────────────┘           │
│                                         ┌────────┐  ┌────┐          │
│                                         │ CANCEL │  │ OK │          │
│                                         └────────┘  └────┘          │
└─────────────────────────────────────────────────────────────────────┘
```

INFORMATION PROCESSING APPARATUS, NETWORK SYSTEM, AND MEDIUM

CROSS-REFERENCE TO RELATED APPLICATION

This application is based on and claims priority under 35 USC 119 from Japanese Patent Application No. 2019-227035 filed on Dec. 17, 2019, the contents of which are incorporated herein by reference.

TECHNICAL FIELD

The present disclosure relates to an information processing apparatus, a terminal, a network system, and a medium.

BACKGROUND

In recent years, information processing apparatuses that manage devices using remote control are known.

For example, JP-A-2014-112060 discloses an information processing apparatus that operates a plurality of devices having different time zones in consideration of a time difference between a base time zone and each time zone so that the plurality of devices are operated at a predetermined time in each time zone.

The needs of users are diversifying in the management of devices using the remote control. Therefore, there has been a demand for a technique capable of improving the convenience of the information processing apparatus.

The present disclosure has been made to solve the above-mentioned problems and can be implemented as the following modes.

SUMMARY

The present disclosure provides an information processing apparatus comprising: processing circuitry configured to: acquire information regarding a processing content to be performed by a terminal; acquire information regarding a designated time at which the terminal is designated to perform the processing content; acquire a selection of a base time zone from a plurality of time zones including at least a first time zone to which the information processing apparatus belongs and a second time zone to which the terminal belongs, wherein the designated time is corrected according to the selected base time zone to set an execution time at which the terminal performs the processing content; and transmit an instruction to the terminal to perform the processing content at the execution time.

BRIEF DESCRIPTION OF DRAWINGS

FIG. 5 is an example of a screen displayed by a display unit in the remote operation reservation process;
FIG. 7 is an example of a screen displayed by the display unit in the reservation information display process:
FIG. 9 is an example of a screen displayed by the display unit in the execution information display process;
FIG. 10 is an example of a detailed execution information screen:
FIG. 12 is an example of a screen displayed by the display unit in another embodiment.

DESCRIPTION OF EMBODIMENTS

A. First Embodiment

Figure 1:
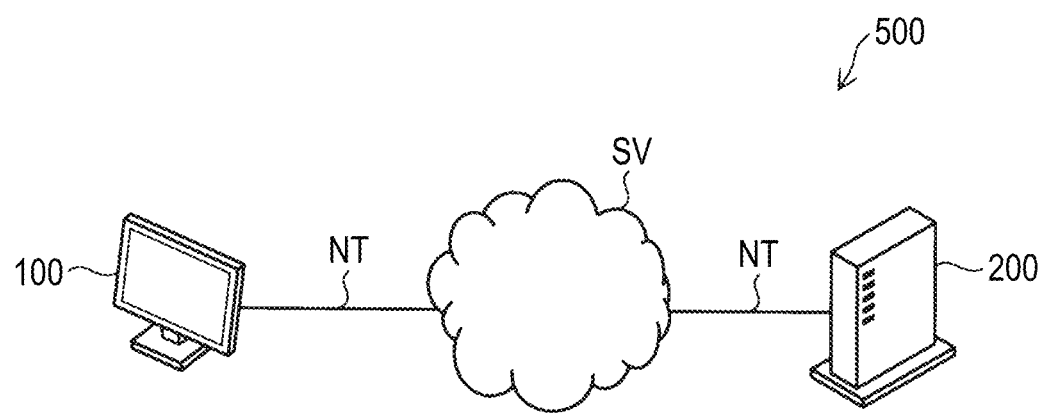
FIG. 1 is an explanatory diagram showing an outline of a network system.

FIG. 1 is an explanatory diagram showing an outline of a network system 500 according to an embodiment of the present disclosure. In the present embodiment, the network system 500 is configured such that an information processing apparatus 100 remotely operates a terminal 200 to be operated via a server SV.

In addition, in the present embodiment, the network system 500 includes only one terminal 200 to be operated but may include a plurality of terminals 200 to be operated. The information processing apparatus 100, the terminal 200 to be operated, and the server SV are connected to each other via a network NT.

Figure 2:
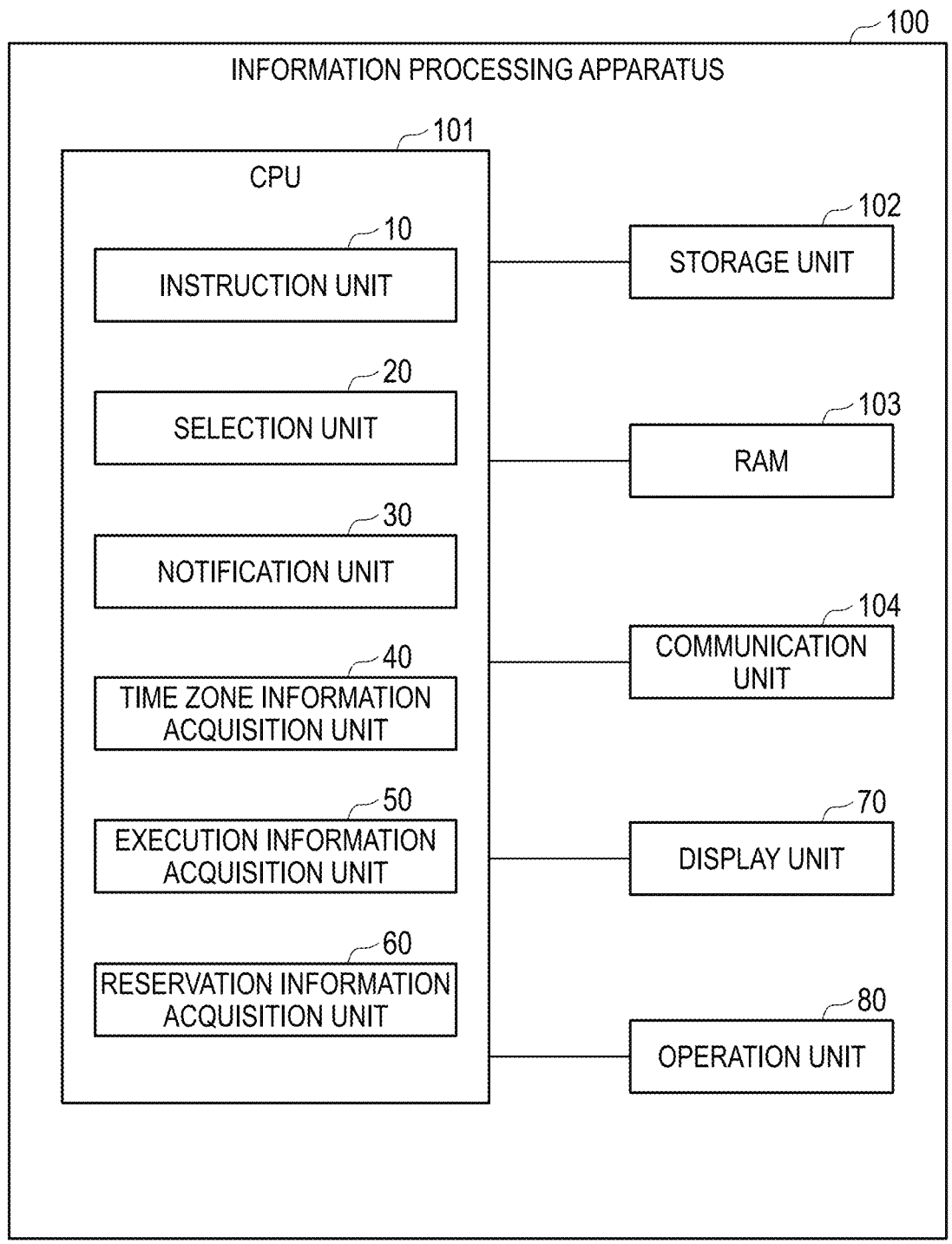
FIG. 2 is a block diagram of an information processing apparatus.

FIG. 2 is a block diagram of the information processing apparatus 100. The information processing apparatus 100 includes a central processing unit (CPU) 101, a storage unit 102, a random access memory (RAM) 103, a communication unit 104, a display unit 70, and an operation unit 80. In the present embodiment, the information processing apparatus 100 is a personal computer. The information processing apparatus 100 is not limited to a personal computer and may be, for example, a tablet personal computer, a smart device, a mobile phone device, or the like. The CPU 101 loads the control program stored in the storage unit 102 into the RAM 103 and executes the control program to function as an instruction unit 10, a selection unit 20, a notification unit 30, a time zone information acquisition unit 40, an execution information acquisition unit 50, and a reservation information acquisition unit 60. The CPU 101 is an example of a processing circuit. The storage unit 102 is, for example, a magnetic disk drive type hard disk drive (HDD) or a flash memory.

Figure 3:
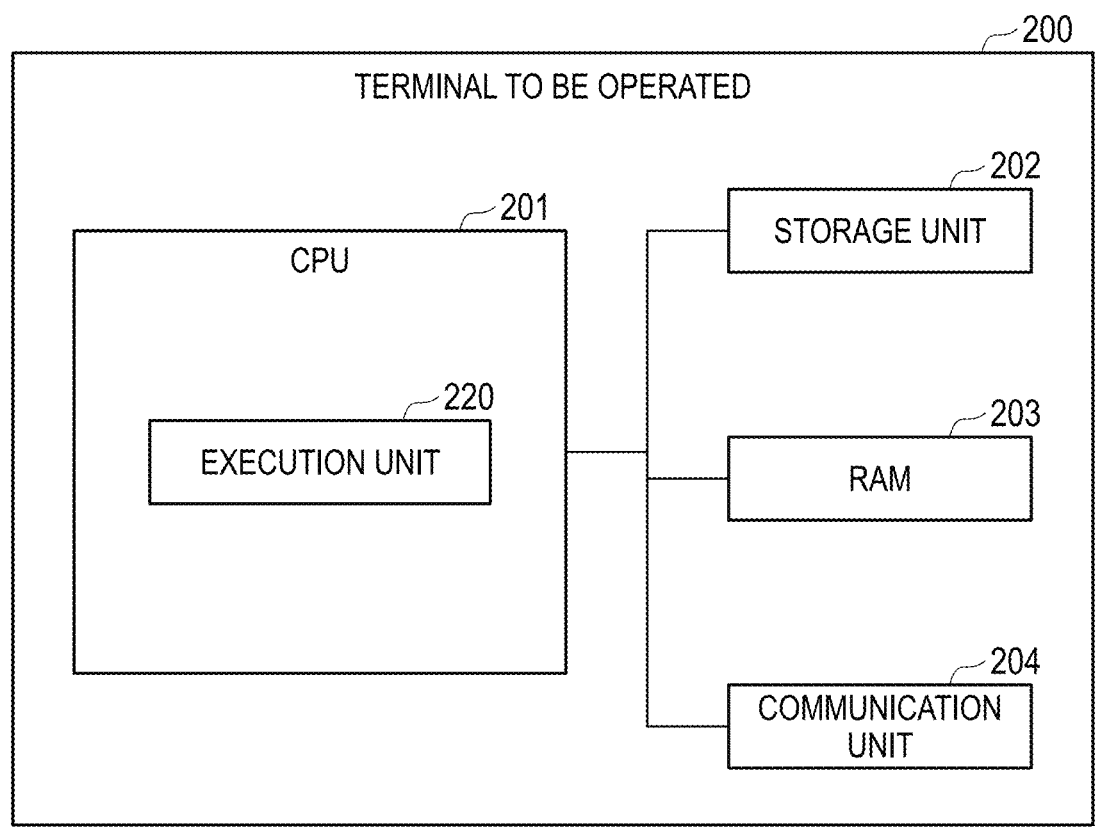
FIG. 3 is a block diagram of a terminal to be operated.

FIG. 3 is a block diagram of the terminal 200 to be operated. The terminal 200 to be operated includes a CPU 201, a storage unit 202, a RAM 203, and a communication unit 204. In the present embodiment, the terminal 200 to be operated is a network attached storage (NAS) device operated by the information processing apparatus 100. The terminal 200 to be operated is not limited to a NAS device and may be any terminal that can be operated via a network, for example, a network device such as an access point or a switch, a personal computer, or a smart home appliance having a communication function.

The CPU 201 loads the control program stored in the storage unit 202 into the RAM 203 and executes the control program to function as an execution unit 220 that executes a process at an execution time based on the instruction received by the communication unit 204 from the information processing apparatus 100. The CPU 201 is an example of a second processing circuit. The storage unit 202 is, for example, a magnetic disk drive type hard disk drive (HDD) or a flash memory. The communication unit 204 is an example of a receiving unit.

Meanwhile, with the recent globalization, a network system 500 in which one or a plurality of terminals 200 to be operated having different time zones can be remotely operated by the information processing apparatus 100 has become widespread. However, when the information processing apparatus 100 remotely operates the terminal 200 to be operated having different time zones, it is necessary for the user to calculate from a time difference between the time zone in which the information processing apparatus 100 is placed (hereinafter, referred to as a "first time zone") and the time zone in which the terminal 200 to be operated is placed (hereinafter referred to as a "second time zone") and set the result as the execution time.

Here, the network system 500 of the present embodiment is configured so that the user can select a base time zone that is a time zone as a base when calculating the execution time at which the terminal to be operated executes the process. The "time zone" is represented by, for example, a time difference from Coordinated Universal Time (UTC) or a city name.

When the user inputs each piece of information on a reservation processing screen displayed on the display unit 70 of the information processing apparatus 100, the network system 500 of the present embodiment can perform a remote operation reservation process for making a reservation for causing the terminal 200 to be operated to execute a predetermined process at a predetermined time. FIG. 5 shows an example of a reservation processing screen S1 displayed by the display unit 70 in the remote operation reservation process.

In the present embodiment, the user can operate the operation unit 80 of the information processing apparatus 100 to input the instruction content regarding the remote operation to input locations b1, b2, and b3. Specifically, the processing content in the remote operation can be input or selected in the input location b1. In the present embodiment, the input location b1 has a configuration in which the processing content can be selected from "update". "restart", "shutdown", and the like. The input location b2 has a configuration in which a base time zone can be selected from the first time zone and the second time zone. The input location b3 has a configuration in which a designated time for executing the process input to the input location b1 can be input. The instruction unit 10 acquires the information input to each of the input locations b1, b2, and b3.

Further, as shown in FIG. 5, the display unit 70 may display in an area a1 the current time in the first time zone and the second time zone. Further, in the area a1, the corrected execution time in the first time zone, and the second time zone may be displayed according to the designated time input by the user in the input location b3. The configuration may not have the area a1. In this case, the information processing apparatus 100 may be configured not to acquire the second time zone information. In the present embodiment, the execution time before correction is referred to as "designated time" in order to make it easier to understand before and after correction.

Figure 4:
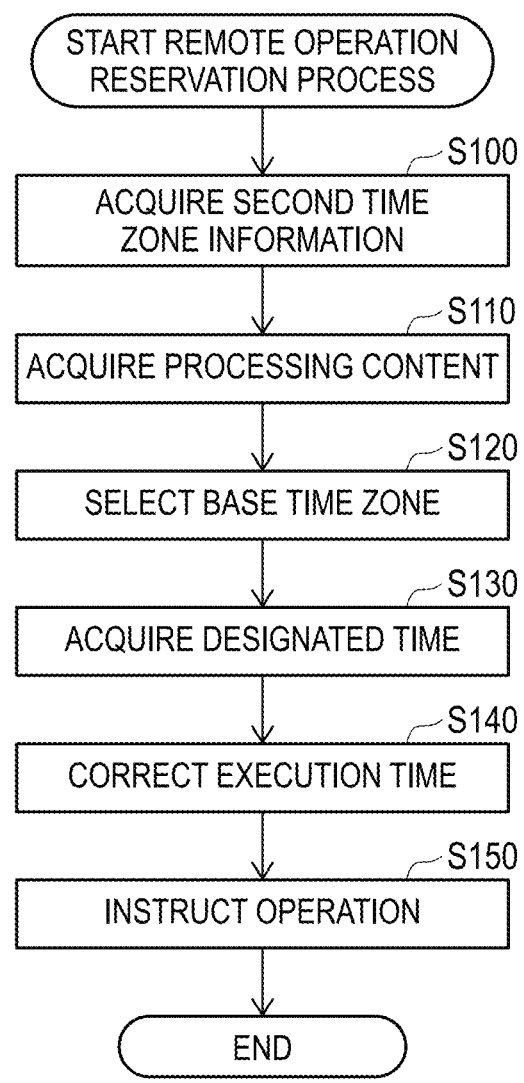
FIG. 4 is a flowchart showing an example of a remote operation reservation process.

FIG. 4 is a flowchart showing an example of the remote operation reservation process. First, in step S100, the time zone information acquisition unit 40 acquires the second time zone information from the terminal 20 to be operated via the server SV. Next, in step S110, the instruction unit 10 acquires the information on the input location b1 which is the processing content to be performed in the terminal 200 to be operated selected by the user.

Subsequently, in step S120, the selection unit 20 causes the display unit 70 to display the first time zone and the second time zone (see FIG. 5). Then, the instruction unit 10 acquires information on the input location b2 that is the base time zone selected by the user.

Subsequently, in step S130, the instruction unit 10 acquires the information on the input location b3 that is the designated time that is input by the user to cause the terminal 200 to be operated to execute the process. Steps S110 to S130 are not limited to this order and can be performed in any order and may be performed in parallel.

Subsequently, in step S140, the instruction unit 10 corrects the designated time acquired in step S130 to the execution time calculated using the time difference between the second time zone and the base time zone. The designated time may be the same as the execution time. Strictly speaking, in this case, the time is not "corrected" but the process itself of rewriting the designated time with the execution time is performed. Therefore, since the process performed in step S140 can be said to be "setting" in a broader sense, the term "setting" may be used in this specification and the like.

As the correction of the designated time performed by the instruction unit 10 in step S140, a case where the first time zone is the Japanese time zone and the second time zone is the American time zone which is 14 hours behind Japan will be described as an example. When the first time zone is selected as the base time zone, the execution time is corrected by going back from the designated time by 14 hours, which is the time difference between the base time zone (first time zone) and the second time zone. For example, when the first time zone is selected as the base time zone and the designated time is 18:00 on November 26th, the execution time is corrected to 4:00 on November 26th, which is obtained by going back by 14 hours from the time of 18:00 on November 26th input as the designated time.

Finally, in step S150, the instruction unit 10 transmits a command to the terminal 200 to be operated via the server SV so as to perform the processing content designated at the execution time.

Furthermore, the information processing apparatus 100 of the present embodiment performs a reservation information display process for displaying whether or not the terminal 200 to be operated is set to perform a process according to the operation instruction of the information processing apparatus 100. FIG. 7 is an example of a reservation display screen S2 displayed on the display unit 70. In FIG. 7, a case where the network system 500 includes a plurality of terminals 200 to be operated is shown as an example. In the present embodiment, the reservation display screen S2 displays fields of "name", "reservation success or failure", "connection status", "installation location", "model number", and "last updated date and time" included in the reservation information. The "name" field indicates the name given to the terminal 200 to be operated in the network system 500, and the "reservation success or failure" field indicates whether or not the terminal 200 to be operated has been set to perform the process at the execution time according to the instruction in the remote operation, or that no instruction in the remote operation has been made, and the "connection status" field indicates the connection status of each terminal 200 to be operated to the network NT. The "installation location" field indicates the installation location of each terminal 200 to be operated, the "model number" field indicates a number indicating the serial number or the like of each terminal 200 to be operated, and the "last updated date and time" indicates the last date and time when the information of each field was updated. The reservation information does not have to display all the above-mentioned information, and may be information that includes only "reservation success or failure" or may be configured to display information other than the above-mentioned information. Further, in the present embodiment, the reservation successes and failures of a plurality of terminals 200 to be operated are displayed as a list but may be displayed for each terminal 200 to be operated.

Figure 6:
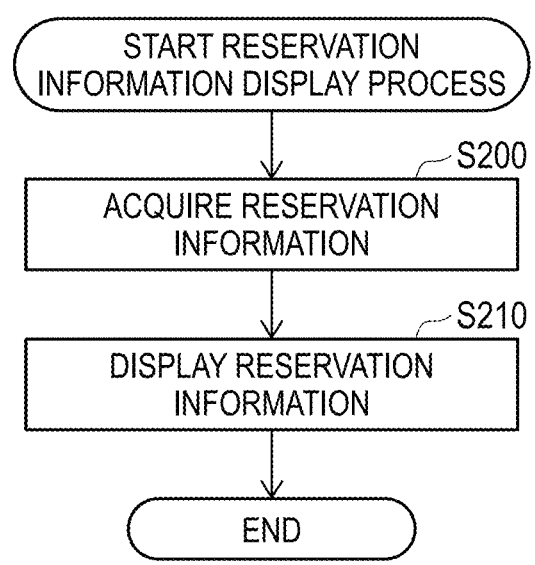
FIG. 6 is a flowchart showing an example of a reservation information display process.

FIG. 6 is a flowchart showing an example of a reservation information display process. The reservation information display process is started after an operation instruction is given to the terminal 200 to be operated. This process may be repeatedly executed on a regular basis.

First, the reservation information acquisition unit 60 acquires reservation information from the terminal 200 to be operated in step S200. Next, in step S210, the reservation information acquisition unit 60 causes the display unit 70 to display the reservation information acquired in step S200. When the network system 500 includes a plurality of terminals 200 to be operated, the reservation information display process may be performed for each terminal 200 to be operated for which the remote operation reservation process has been performed or may be performed collectively for all the terminals 200 to be operated.

Furthermore, the information processing apparatus 100 of the present embodiment performs an execution information display process for displaying whether or not the process set by the remote operation reservation process has been executed. FIG. 9 is an example of an execution information display screen S3 displayed by the display unit 70 in the execution information display process. In FIG. 9, the case where the network system 500 includes a plurality of terminals 200 to be operated is shown as an example. The execution information display screen S3 displays fields of "name", "execution success or failure", "connection status", "installation location", "model number", and "last updated date and time" included in the execution information. The "execution successor failure" field indicates whether or not the terminal 200 to be operated actually executed the processing content reserved in the terminal 200 to be operated by the remote operation reservation process. The execution information may be information including only "execution success or failure".

Further, when the user selects one terminal 200 to be operated on the execution information display screen S3 shown in FIG. 9, the screen transits from the execution information display screen S3 to a detailed execution information screen S4 which is detailed information of the selected terminal 200 to be operated as shown in FIG. 10. The detailed execution information screen S4 displays the "remote operation processing content" and the "execution time" of the operation instruction in the remote operation in association with each other, in addition to the display content of the execution information display screen S3. The "execution time" field indicates the time at which the process reserved by the remote operation was actually executed in the second time zone.

Figure 8:
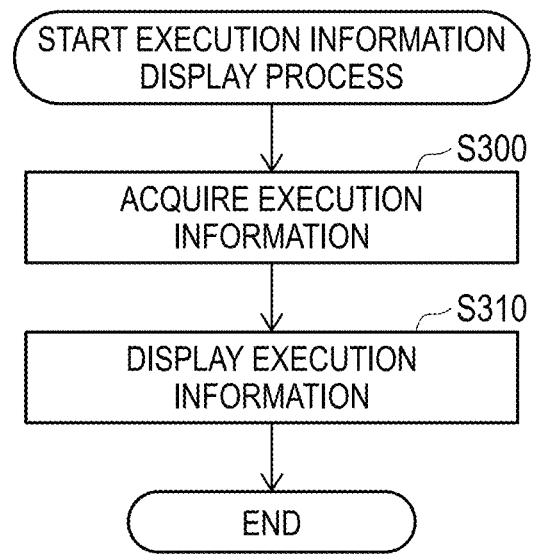
FIG. 8 is a flowchart showing an example of an execution information display process.

FIG. 8 is a flowchart showing an example of an execution information display process performed by the information processing apparatus 100. This process is executed after the execution time in the base time zone set by the remote operation reservation process has passed. This process may be repeatedly executed on a regular basis.

First, the execution information acquisition unit 50 acquires the execution information from the terminal 200 to be operated via the server SV in step S300. Next, in step S310, the execution information acquisition unit 50 causes the display unit 70 to display the execution information acquired in step S300. The execution information display process may be performed for each terminal 200 to be operated for which the remote operation reservation process has been performed or may be performed collectively for all terminals 200 to be operated included in the network system 500.

According to the present embodiment described above, the user can select the base time zone at the execution time from a plurality of time zones including the first time zone to which the information processing apparatus 100 belongs and the second time zone to which the terminal 200 to be operated belongs. Thereby, the user does not need to calculate the time zone when reserving the remote operation of the terminal 200 to be operated and the convenience of the information processing apparatus 100 in the remote operation can be improved. Further, since the execution information acquisition unit 50 acquires the execution information, it is possible to display whether or not the terminal 200 to be operated has performed the process. As a result, the user can easily check whether or not the reserved processing content has been executed. Further, in the present embodiment, it is possible to display a list of execution successes or failures of a plurality of terminals 200 to be operated. Thereby, the user can easily check whether or not there is a terminal to be operated in which an error has occurred, and further, the terminal 200 to be operated in which an error has occurred can be specified. Further, since the reservation information acquisition unit 60 acquires the reservation information, it is possible to display whether or not the terminal 200 to be operated is set to perform the process at the execution time. Accordingly, even before the terminal 200 to be operated executes the process, the user can easily check whether or not the reservation is correctly made. Further, in the present embodiment, it is possible to display a list of reservation successes or failures of a plurality of terminals 200 to be operated. Therefore, the user easily determines whether there is a terminal 200 to be operated for which a reservation has not been made and specifies the terminal 200 to be operated for which a reservation has not been made.

B. Second Embodiment

Figure 11:
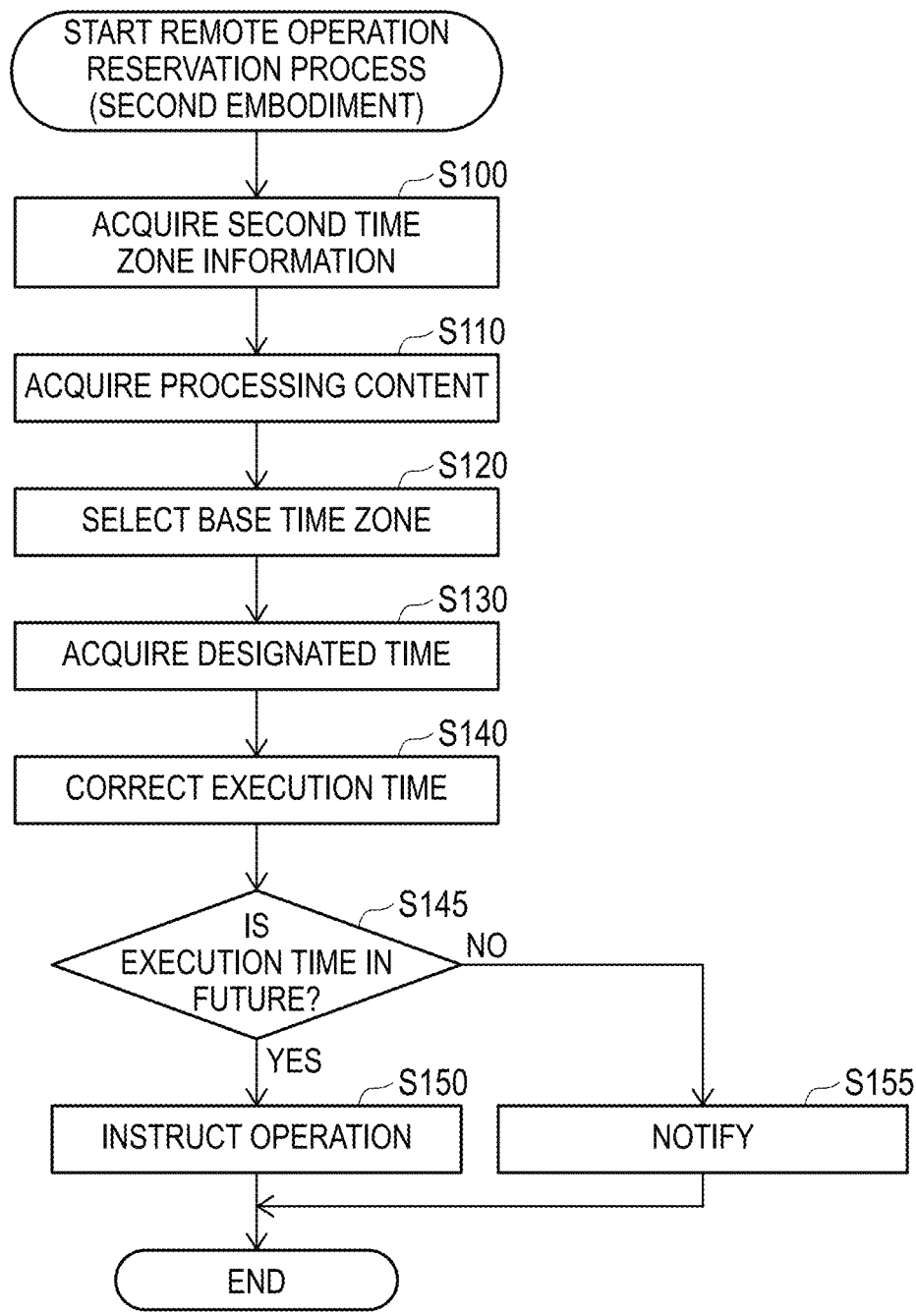
FIG. 11 is a flowchart showing an example of a remote operation reservation process in a second embodiment.

FIG. 11 is a flowchart showing an example of a remote operation reservation process in a second embodiment, which is different from the first embodiment only in that a notification is given when the execution time in the second time zone is not a future time. The same step numbers are assigned to the same processing contents as those in FIG. 4.

After correcting the execution time in step S140, the instruction unit 10 determines whether or not the corrected execution time is a future time in step S145. If the corrected execution time is a future time, the instruction unit 10 proceeds to the processing of step S150. On the other hand, if the corrected execution time is not the future time, that is, if the corrected execution time is the past time or the current time, the notification unit 30 notifies the user that the corrected execution time is not the future time and ends the remote operation reservation process, in step S155. In the present embodiment, when the corrected execution time is not a future time, the remote operation reservation process is terminated after notifying the user. However, the processing may return to step S120 or step S130 and the user may be prompted to input a designation time or time zone information again.

As an example when the corrected execution time is not a future time, a case where the first time zone is Japanese time zone and the second time zone is New Zealand time zone which is 4 hours ahead of Japan is described. If the second time zone is selected as the base time zone and the designated time is set to a time within 4 hours after the current time in Japan, the execution time in New Zealand will be in the past and it will be notified to the user.

According to the present embodiment described above, the notification unit 30 notifies when the corrected execution time is not a future time. Therefore, even if a past time is erroneously designated, the user can recognize that the terminal 200 to be operated cannot execute the process due to an error in the execution time. The determination of whether the execution time in the second time zone is a future time may be made by the server SV or the terminal 200 to be operated.

C. Other Embodiment (C1) In the above-described embodiment, the execution time is corrected by the instruction unit 10 of the information processing apparatus 100. Instead, the server SV acquires the instruction time from the information processing apparatus 100, the base time zone, and the second time zone information and corrects the execution time.

In this case, the information processing apparatus 100 may be configured not to acquire the second time zone information. The detailed time zone information is not displayed on the reservation processing screen S1 of the information processing apparatus 100 and the user can select only whether the time zone of the information processing apparatus 100 is set to be the base time or the time zone of the terminal 200 to be operated is set to be the base time.

(C2) In the above-described embodiment, the execution unit 220 in the terminal 200 to be operated sets in advance the process to be executed at the execution time according to the instruction from the information processing apparatus 100. Instead of instructing, in advance, the terminal 200 to be operated to execute the process at the execution time, when the execution time comes, the information processing apparatus 100 or the server SV may give an operation instruction so that the processing content reserved for the terminal 200 to be operated is immediately executed. In this case, the "reservation success or failure" field of the reservation display screen may be configured to display whether or not the reservation information is recorded in the information processing apparatus 100 or the server SV that gives the operation instruction at the execution time.

(C3) In the above-described embodiment, the information processing apparatus 100 performs the reservation information display process and the execution information display process. Instead, the information processing apparatus 100 may perform only one of the processes and either process may be omitted.

(C4) In the above-described embodiment, the selection unit 20 causes the user to select the base time zone. Alternatively, the selection unit 20 can select the base time zone according to the processing content of the operation instruction.

(C5) In the above-described embodiment, when the processing content and the designated time are registered in advance, the execution time may be corrected only by the user selecting the base time zone.

(C6) In the above-described embodiment, the reservation processing screen S1 is configured to set each terminal 200 to be operated. However, as shown in FIG. 12, in the network system 500 including a plurality of terminals 200 to be operated, the plurality of terminals 200 to be operated may be collectively operated. For example, when the user selects the second time zone, which is the time zone to which each operation terminal belongs, at the input location b2, the instruction unit 10 gives an operation instruction for causing each terminal 200 to be operated to perform the process at the designated time in the time zone to which the operation terminal 200 belongs. If the first time zone, which is the time zone to which the information processing apparatus belongs, is selected, the instruction unit 10 gives an operation instruction so that all the terminals 200 to be operated operates the process all at once at the designated time in the first time zone.

Further, as shown in FIG. 12, the display unit 70 can display the number of terminals 200 to be operated to be remotely operated by the information processing apparatus 100 in an area a2. In FIG. 12, the second time zone of the input location b2 may be displayed as "each terminal to be operated time", for example, indicating each time zone of each terminal 200 to be operated, or the time zones to which the respective terminals 200 to be operated belong may all be listed in a selectable configuration, or a combination of these may be used.

(C7) In the above-described embodiment, the network system 500 may have a configuration without the server SV. In this case, the information processing apparatus 100 and the terminal 200 to be operated directly transmit and receive various information.

The present disclosure is not limited to the above-described embodiments and can be realized with various configurations without departing from the spirit of the present disclosure. For example, in the technical features in the embodiments corresponding to the technical features described in the section of the summary of the disclosure, a replacement, and a combination can be made as appropriate in order to solve the above-mentioned problems or to achieve a part or all of the above-mentioned effects. If the technical features are not described as essential in this specification, they can be deleted as appropriate.

The summary of the present disclosure described above is as follows.

(1) According to one embodiment of the present disclosure, the information processing apparatus includes a processing circuit, in which the processing circuit is configured to instruct a terminal to be operated to perform a predetermined process at an execution time and to enable selection of a base time zone from a plurality of time zones including at least a first time zone to which the information processing apparatus belongs and a second time zone to which the terminal to be operated belongs. The execution time is set according to the base time zone. According to the information processing apparatus of this aspect, the base time zone for the execution time can be selected from the plurality of time zones including the first time zone to which the information processing apparatus belongs and the second time zone to which the terminal to be operated belongs and therefore, the convenience of the information processing apparatus can be improved.

(2) In the information processing apparatus of the above-described aspect, the processing circuit may be further configured to acquire second time zone information indicating the second time zone from the terminal to be operated. The setting may be performed using a time difference between the second time zone and the base time zone. According to the information processing apparatus of this aspect, the execution time can be corrected by using the time difference between the second time zone and the base time zone.

(3) In the information processing apparatus of the above-described aspect, the processing circuit may be configured to instruct the terminal to be operated via a server and acquire the second time zone information indicating the second time zone via the server. The execution time may be set by the server. According to the information processing apparatus of this aspect, the execution time can be corrected by the server.

(4) In the information processing apparatus of the above-described aspect, the processing circuit may be further configured to give a notification when the execution time in the second time zone is not a future time. According to the information processing apparatus of this aspect, since the notification is given when the execution time is not a future time, it is possible to prompt the user to set the time so that the remote operation can be surely performed.

(5) In the information processing apparatus of the above-described aspect, the processing circuit may be further configured to acquire execution information including information indicating whether or not the terminal to be operated has performed the predetermined process. The information processing apparatus may further include a display unit displaying the execution information. According to the information processing apparatus of this aspect, execution information can be displayed.

(6) In the information processing apparatus of the above-described aspect, the processing circuit may be further configured to acquire reservation information including information indicating whether or not the terminal to be operated has been set to perform the predetermined process at the execution time according to an instruction. The information processing apparatus may further include a display unit displaying the reservation information. According to the information processing apparatus of this aspect, reservation information can be displayed.

(7) The information processing apparatus of the above-described aspect may further include a display unit displaying the predetermined process in the instruction and the execution time in association with each other. According to an information processing apparatus of this aspect, the predetermined process in the instruction and the execution time can be displayed in association with each other.

The present disclosure can be realized in various forms. For example, a terminal to be operated by an information processing apparatus, an instruction method for the to-be-operated terminal in the information processing apparatus, a computer program for realizing the function of the information processing apparatus, a system including this information processing apparatus, or the like can be realized. The computer program may be recorded in a non-transitory tangible recording medium that can be read by a computer.

The invention claimed is:

1. An information processing apparatus, comprising:
processing circuitry configured to:
acquire information regarding a processing content to be performed by a terminal;
acquire information regarding a designated time at which the terminal is designated to perform the processing content;
acquire a selection of a base time zone from a plurality of time zones including at least a first time zone to which the information processing apparatus belongs and a second time zone to which the terminal belongs, the base time zone being a time zone as a base for setting an execution time at which the terminal performs the processing content;
in response to the first time zone being selected as the base time zone, calculate a time difference between the second time zone and the first time zone, and correct the designated time using the time difference to set the execution time in the second time zone at which the terminal performs the processing content;
determine whether or not the corrected designated time is a future time;
output a notification in a case where it is determined that the corrected designated time is not the future time; and
transmit an instruction to the terminal to perform the processing content at the execution time in a case where it is determined that the corrected designated time is the future time.

2. The information processing apparatus according to claim 1, wherein
the processing circuitry is further configured to acquire second time zone information indicating the second time zone from the terminal.

3. The information processing apparatus according to claim 2, wherein
the processing circuitry is configured to:
transmit an instruction to the terminal via a server; and
acquire the second time zone information indicating the second time zone via the server, and
the execution time is set by the server.

4. The information processing apparatus according to claim 1, wherein
the processing circuitry is further configured to acquire execution information including information indicating whether or not the terminal has performed the predetermined process, and
the information processing apparatus further comprises a display configured to display the execution information.

5. The information processing apparatus according to claim 4, wherein
the processing circuitry s configured to control the display to display the execution information with respect to a plurality of terminals concurrently.

6. The information processing apparatus according to claim 1, wherein
the processing circuitry is further configured to acquire reservation information including information indicating whether or not the terminal has been set to perform the predetermined process at the execution time according to an instruction, and
the information processing apparatus further comprises a display configured to display the reservation information.

7. The information processing apparatus according to claim 6, wherein
the processing circuitry is configured to control the display to display the reservation information with respect to a plurality of terminals concurrently.

8. The information processing apparatus according to claim 1, further comprising:
a display configured to display information regarding the predetermined process in an instruction and the execution time in association with each other.

9. The information processing apparatus according to claim 1, wherein
the instruction includes information regarding the execution time.

10. The information processing apparatus according to claim 1, wherein the processing circuitry is configured to control display of a first input area to acquire an input regarding the processing content to be performed by the terminal.

11. The information processing apparatus according to claim 1, wherein
the processing circuitry is configured to control display of a second input area to acquire the selection of the base time zone.

12. The information processing apparatus according to claim 1, wherein
the processing circuitry is configured to control display of a third input area to acquire an input of the information regarding the designated time.

13. The information processing apparatus according to claim 1, wherein
the processing circuitry is configured to:
acquire information regarding the second time zone from the terminal; and
control display of a first current time in the first time zone, and a second current time in the second time zone.

14. The information processing apparatus according to claim 1, wherein
the processing circuitry is configured to, in response to the second time zone being selected as the base time zone, set the execution time to be the designated time without correcting the designated time.

15. A network system, comprising:
an information processing apparatus; and
a terminal to be operated, wherein
the information processing apparatus includes processing circuitry configured to
acquire information regarding a processing content to be performed by a terminal,
acquire information regarding a designated time at which the terminal is designated to perform the processing content,
acquire a selection of a base time zone from a plurality of time zones including at least a first time zone to which the information processing apparatus belongs and a second time zone to which the terminal belongs, the base time zone being a time zone as a base for setting an execution time at which the terminal performs the processing content,
in response to the first time zone being selected as the base time zone, calculate a time difference between the second time zone and the first time zone, and correct the designated time using the time difference to set the execution time in the second time zone at which the terminal performs the processing content;
determine whether or not the corrected designated time is a future time;
output a notification in a case where it is determined that the corrected designated time is not the future time; and
transmit an instruction to the terminal to perform the processing content at the execution time in a case where it is determined that the corrected designated time is the future time.

16. A non-transitory computer-readable medium including executable instructions, which when executed by a computer cause the computer to:
acquire information regarding a processing content to be performed by a terminal;
acquire information regarding a designated time at which the terminal is designated to perform the processing content;
acquire a selection of a base time zone from a plurality of time zones including at least a first time zone to which the computer belongs and a second time zone to which the terminal belongs, the base time zone being a time zone as a base for setting an execution time at which the terminal performs the processing content;
in response to the first time zone being selected as the base time zone, calculate a time difference between the second time zone and the first time zone, and correct the designated time using the time difference to set the execution time in the second time zone at which the terminal performs the processing content;
determine whether or not the corrected designated time is a future time;
output a notification in a case where it is determined that the corrected designated time is not the future time; and
transmit an instruction to the terminal to perform the processing content at the execution time in a case where it is determined that the corrected designated time is the future time.

\* \* \* \* \*